Dec. 13, 1955     M. DI GIULIO     2,726,559
TEMPLATE WITH DRILL BUSHING
Filed Feb. 4, 1953     2 Sheets-Sheet 1
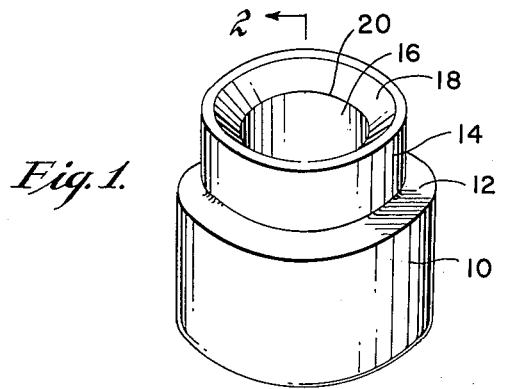
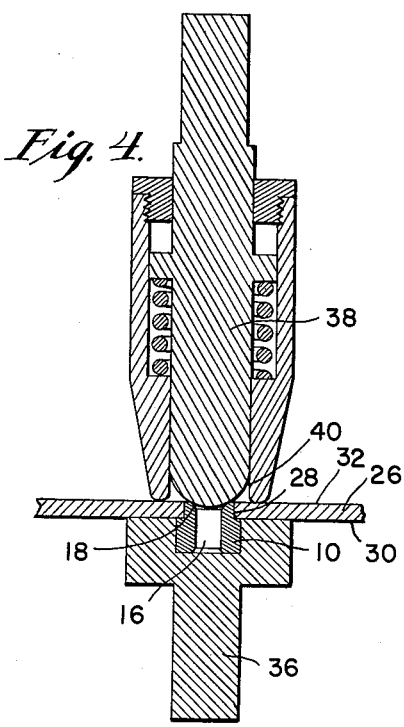
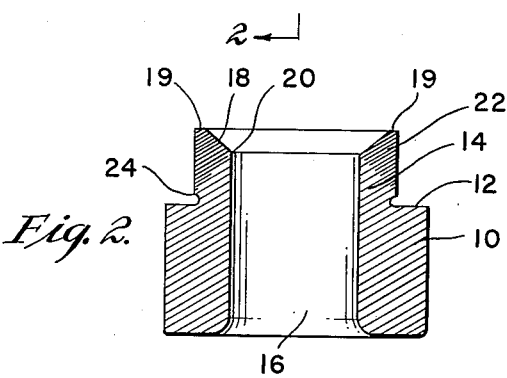
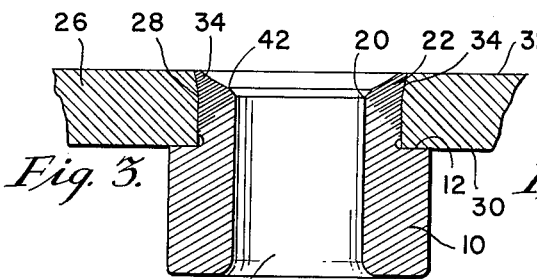
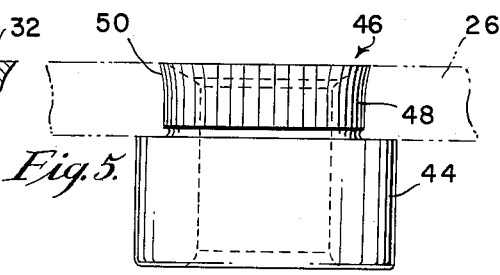
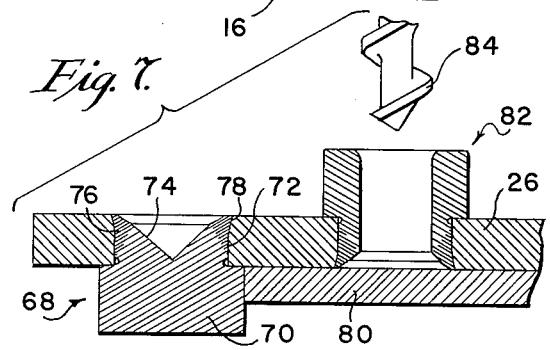
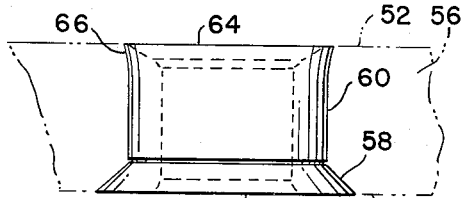
INVENTOR.
MARIO DI GIULIO
BY
*Caesar and Rivise*
ATTORNEYS.

Dec. 13, 1955  M. DI GIULIO  2,726,559
TEMPLATE WITH DRILL BUSHING
Filed Feb. 4, 1953  2 Sheets-Sheet 2

INVENTOR.
MARIO DI GIULIO
BY
Caesar and Rivise
ATTORNEYS.

United States Patent Office 2,726,559
Patented Dec. 13, 1955

2,726,559

TEMPLATE WITH DRILL BUSHING

Mario Di Giulio, Springfield, Pa.

Application February 4, 1953, Serial No. 335,071

3 Claims. (Cl. 77—62)

This invention relates to a novel drill bushing, nesting or locating pin and the like, a method of making the same, and a method of installing same in a template, preferably but not necessarily of light gage material.

Heretofore, there were several methods in common use for installing a drill bushing in a template. One of said methods was to provide a flange on the bushing and retain the flange on the template by means of two rivets. This method was uneconomical because it necessitated the drilling and countersinking of the underside of the rivet holes and then riveting the flange in the holes. A further disadvantage of this method was that the drill bushings, because of the flanges, could not be installed close together in the template without interfering with each other.

Another method of installing drill bushings in templates heretofore employed with the straight type bushing necessitated the soldering or brazing of the bushing to the template. Because of the heat applied during this installation, warpage or distortion of the template resulted and also required the cleaning of scales from the template caused by the applied heat. Moreover, each bushing had to be properly set prior to soldering or brazing with its center line axis perpendicular to the plane of the template and the perpendicularity of the axis of each bushing had to be rechecked after soldering or brazing.

It is the primary object of the present invention to provide a drill bushing which overcomes all of the disadvantages residing in the conventional methods of installing the bushing in a template as mentioned hereinabove.

A further object of this invention is to provide a bushing which can be installed in a template without the use of riveting, soldering or brazing but merely by the use of impact pressure on one end of the bushing. Such an installation assures the perpendicularity of the axis of the bushing to the template without the necessity of checking the setting on the bushing prior or subsequent to the installation. Such an installation also provides the advantage of permitting the installation of a large number of bushings in close proximity to each other.

Another object of this invention is to provide a drill bushing and a method of installing the same which permits ready removal of the installed bushing for replacement without distorting the holes in the template. This can be accomplished by drilling away the malleable portion of the bushing.

A further object of this invention is to provide a drill bushing and a method of installing the same which requires no rechecking, straightening, grinding or cleaning of any kind prior or subsequent to the installation, which merely requires a spherical hammer for the installation thereof which does not distort the bore of the drill bushing.

A further object of this invention is to provide a drill bushing which is economical, easy to machine in a lathe-type machine tool and which can be made to any dimensional tolerance desired.

Another object of the invention is to provide a drill bushing in which at least one free end portion is malleable so that the bushing can be readily and easily installed in a template by the use of impact pressure applied to the malleable portion to spread the same into gripping engagement with the template.

A further object of the invention is to provide a drill bushing comprising a malleable portion and a hardened portion, the hardened portion functioning to resist abrasion of a drilling tool operating through the bushing bore.

Yet another object of the invention is to provide a nesting or locating pin in which at least one free end portion is malleable so that it can be installed in a template by the use of impact pressure applied to the malleable portion to spread the same into gripping engagement with the template. The nesting or locating pin serves as a stop to locate or index the work while a drill is applied thereto through the drill bushing.

Other objects and features of the invention will become more apparent as the following description proceeds in connection with the accompanying illustrative drawings, wherein:

Figure 1 is an enlarged perspective view of the drill bushing;

Figure 2 is a reduced sectional view taken on the line 2—2 of Figure 1;

Figure 3 is a view similar to Figure 2 showing the drill bushing in its installed position in a template;

Figure 4 is a vertical sectional view of a preferred tool shown in use in installing the drill bushing in a template;

Figure 5 is an elevational view of a modified form of the drill bushing shown installed in a template, the latter being shown in phantom;

Figure 6 is an elevational view of another modified form of the drill bushing shown installed in a template, the latter being shown in phantom;

Figure 7 is a fragmentary vertical sectional view of a nesting or locating pin secured in a template, and shown indexing a work piece about to be drilled.

Figure 8:
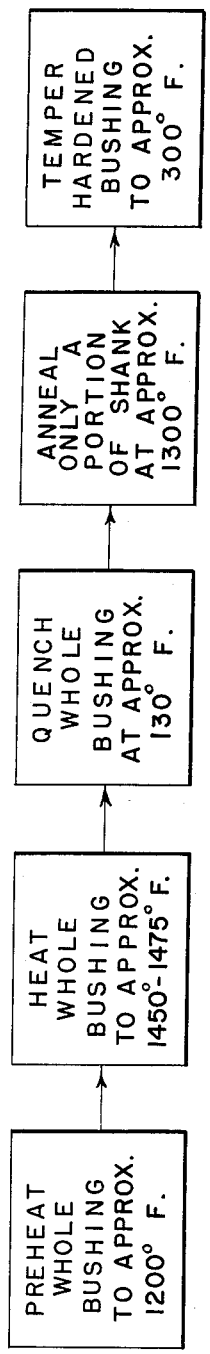
Figure 8 is a flow diagram of one method of making the drill bushing prior to installation.

Specific reference will now be made to the drawings wherein similar reference characters are used for corresponding elements throughout. Attention is called to the fact that while Figures 3, 5 and 6 illustrate the position of the bushing during installation, it should be remembered that the bushings are inverted when used to receive a drill as shown clearly in Figure 7.

In its broadest aspect the present invention comprises the production of a drill bushing, nesting or locating pin and similar element in which at least one free end portion is malleable. Thus when an impact pressure is applied to the malleable portion the same is uniformly spread outwardly from the outer margin of the bushing or nesting pin into gripping engagement with a template.

The bushing or nesting pin, which preferably consists of a predetermined malleable portion and a hardened portion, may be fabricated of any metal that can be subjected to differential hardening, such as graphitic tool steel (molybdenum or tungsten), low carbon steel, and the like, and may be made in any desired shape or dimension. The various methods for making the drill bushing or nesting pin so that only a predetermined portion thereof will be malleable will be described further on in the specification.

The preferred form of bushing is shown in Figures 1 to 4 and comprises an enlarged or shoulder portion 10, preferably but not necessarily circular in cross section. integral with or connected to the upper face 12 of the shoulder portion is a reduced portion or shank 14 which may or may not be of the same cross section as the shoulder portion. Extending substantially centrally through the entire bushing is a bore 16 of any predetermined diameter. The upper or free end of the shank is countersunk as at 18 and its juncture with the bore is shown at 20.

By the various methods which will be described hereinafter, a predetermined portion only of the upper end of the shank is malleable as shown at 22 whereas the remainder of the bushing is hardened. It is preferred that the area of the malleable portion be bounded by a line passing through the juncture 20 of the countersunk portion with the bore and the juncture 24 of the shoulder portion 10 and the shank 14, as shown clearly in Figure 2. While the malleable portion does not necessarily have to be confined to this area, it should not extend beyond the juncture 20 and encompass an area of the shank immediately surrounding the upper portion of the bore for a reason which will appear hereinafter.

To install the bushing in a template 26 which is normally provided with one or more apertures or holes 28 approximating the outer diameter of the shank 14, the shank of the bushing is inserted in the aperture until the face 12 of the shoulder abuts the lower face 30 of the template and the upper or free end of the shank lies substantially flush with the upper face 32 of the template. Thereafter, impact pressure is applied to part of the countersunk portion whereby the malleable portion 22 of the bushing is spread uniformly outwardly as at 34. The template being malleable will also spread and hence, the malleable portion of the bushing will be spread into gripping engagement with the template.

Different types of tools may be used to provide an impact pressure on the malleable portion of the bushing. One such tool is illustrated in Figure 4 and comprises a bearing means 36 for holding the bushing in proper position in the template and a spring-urged reciprocable hammer 38 having a spherical or arcuate head 40. The curvature of the head is such that it comes in contact only with the juncture of the portion 18 and the surface 19 of the shank before impact and extends only part way into the countersunk portion 18, terminating at a position 42 slightly above the juncture 20 of the countersunk portion and the bore 16 after impact. The hammer may be operated by manual or motor means and when sufficient impact pressure is applied to the malleable portion it will be spread into gripping engagement with the template as shown clearly in Figure 3. The juncture 20 of the countersunk portion and the bore will not be affected by this impact so that the bore will not be distorted in any manner during the process of installing the bushing in the template.

It will be understood that any other equivalent means may be employed to apply an impact pressure to the malleable portion of the bushing to install the bushing in the template.

The bushing shown in Figure 5 employs the same principle as that previously described except that the shoulder 44 thereof is integral with or connected to a shank portion 46 which is provided on its outer surface with longitudinally extending serrations 48.

Thus when the shank portion 48 of the bushing is inserted through an aperture in the template 26 and an impact pressure is applied to the upper or free end of the shank which is malleable, the upper or free end of the shank will be spread outwardly into gripping engagement with the template as shown at 50. In this construction, the gripping action will be enhanced by the serrations in the shank of the bushing.

The bushing shown in Figure 6 employs the same principle as that previously described except that it is of such design and construction that its end faces lie flush with the corresponding faces 52 and 54 of a template 56 which, in this case, may be of heavy gage material. This bushing comprises an outwardly flared or shoulder portion 58 which is upwardly tapered and is connected to or integral with a shank portion 60, the upper end portion of which is malleable. The bushing is inserted in the template so that both of its end faces 62 and 64 lie flush with the respective faces 52 and 54 of the template. When a proper impact pressure is applied to the countersunk portion in the end face 64, which portion is malleable, the same will spread outwardly and uniformly into gripping engagement as at 66 with the template.

The nesting or locating pin 68 shown in Figure 7 employs the same principle as that previously described with respect to the drill bushings. The nesting pin is a solid metallic member or button without a bore and is preformed to consist of a shoulder portion 70 connected to or integral with a shank 72 having a countersunk portion 74. A predetermined portion 76 of the shank is malleable while the remainder of the nesting pin is hardened. By applying an impact pressure in the countersunk portion, the malleable portion will be spread into gripping engagement as at 78 with the template 26.

The nesting pin is used to index or locate a work piece 80 which is retained against the outer surface of the shoulder of the nesting pin as shown clearly in Figure 7. It will be understood that one or more drill bushings 82 will have been already installed in the template at predetermined locations and it will be seen that a drilling tool 84 can operate through the bore of the bushing to produce holes in the work piece 80.

There are a number of methods of making the bushings or nesting pins described hereinabove whereby only a predetermined portion of the bushing or nesting pin is malleable whereas the remainder of the bushing or nesting pin is hardened. These methods fall into three broad categories as illustrated with respect to the bushings in the flow diagrams of Figures 8, 9, and 10.

With respect to the method set forth in Figure 8, the bushing is first formed in the desired shape and dimension from a tool steel, preferably of the graphitic type (molybdenum or tungsten). The whole bushing is first preheated to approximately 1200° F. and then the temperature of the bushing is raised to approximately 1450°–1475° F. in either an atmospherically controlled or salt bath furnace. The bushing is then removed from the furnace and immediately quenched in a bath of oil or water which is maintained at a temperature of approximately 130° F.

At this point, the entire bushing is hardened and no portion of it is malleable.

A predetermined portion of the bushing is then annealed to about 1300° F. and slowly air cooled rendering only the annealed portion malleable. The annealing may be accomplished by means of a high frequency or radio generator wherein the coil of the generator is wound about the predetermined portion of the bushing which is to be rendered malleable (induction annealing). The annealing may also be accomplished by immersing a predetermined portion only of the bushing in a salt bath at a temperature of approximately 1300° F. followed by slow air cooling. The bushing is then tempered to approximately 300° F. for approximately four hours.

Figure 9:
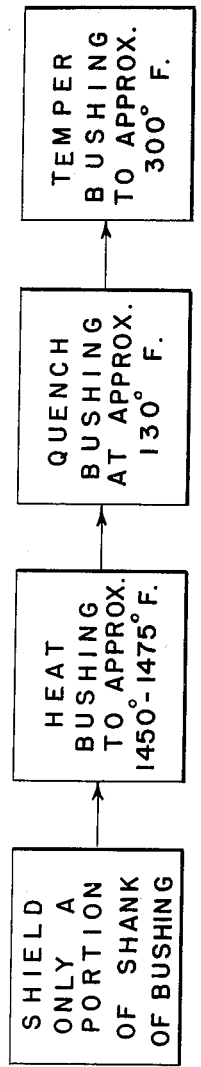
Figure 9 is a flow diagram of another method of making the drill bushing prior to installation.

The method shown in Figure 9 starts with a bushing of any desired shape and dimension which is malleable to begin with. A suitable fixture is used to surround and shield a predetermined portion only of the bushing. The bushing with the fixture attached thereto is preheated to approximately 1200° F. and then to approximately 1450°–1475° F. The bushing with the fixture is then immediately quenched in oil or water which is maintained at a temperature of approximately 130° F. and then the bushing is tempered to approximately 300° F. In this process, the predetermined portion of the bushing which is shielded by the fixture is unaffected by the hardening process and, therefore, remains malleable while the remainder of the bushing is hardened.

Figure 10:
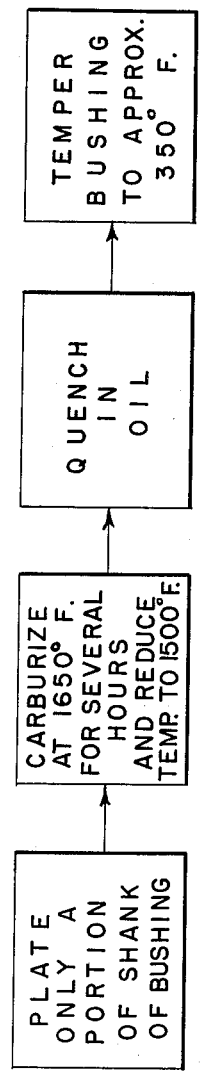
Figure 10 is yet another method of making the drill bushing prior to installation.

In the method shown in Figure 10, a steel of low carbon content, such as 0.10 to 0.30 carbon, is used to make a bushing of any desired shape and dimension. A predetermined portion only of the bushing is plated, preferably with copper, and then the entire bushing is carburized in a salt bath at approximately 1650° F. for approximately three hours. At the end of this period, the temperature is reduced to 1500° F. and the bushing is immediately quenched in oil at approximately 1300° F. Thereafter, the bushing is tempered to approximately 350° F. As a result of this method, the unplated portion of the bushing is case hardened by carburization whereas the plated portion remains malleable.

Thus it will be seen that the present invention provides a novel type of bushing, nesting pin or similar element that can be readily and easily installed in a template by the use of impact pressure applied only to part of the malleable portion thereof. The present invention also provides a method of making a bushing, nesting pin or similar element so that only a predetermined portion thereof is malleable whereas the remainder is hardened and a method of installing the same in a template.

While preferred embodiments of the invention have been shown and described herein, it will be understood by those skilled in the art that minor variations may be made without departing from the spirit of the invention and the scope of the appended claims.

I claim:

1. In combination with a template having a plurality of holes provided therein, a drill bushing having a shoulder abutting one face of the template and a shank connected to the shoulder and extending through the hole, a portion of the free end of the shank being malleable while the remainder of the bushing is hardened, said malleable portion being spread into gripping engagement with the template, whereby the drill bushings may be installed in close proximity to each other and without the use of brazing or soldering, the heat of which normally warps the template.

2. In combination with a template having a plurality of holes provided therein, a drill bushing for each hole having a shoulder abutting one face of the template and a shank connected to the shoulder and extending through the hole, the free end of the shank being countersunk, the shank including an area between the juncture of the countersunk portion with the bore of the bushing and the juncture of the shank with the shoulder which is malleable while the remainder of the bushing is hardened, said malleable portion being spread into gripping engagement with the template, whereby the drill bushings may be installed in close proximity to each other and without the use of brazing or soldering, the heat of which normally warps the template.

3. In combination with a template having a plurality of holes provided therein, a drill bushing for each hole having a shoulder abutting one face of the template and a shank integral with the shoulder and extending through the hole, the free end of the shank being countersunk, the shank having an area including the countersunk portion which is malleable while the remainder of the bushing is hardened, said malleable portion being spread into gripping engagement with the template, whereby the impact on the malleable portion to spread the same draws the shoulder into snug contact with the face of the template assuring perpendicularity of the bushing axis to the plane of the template, and whereby the drill bushings may be installed in close proximity to each other and without the use of brazing or soldering, the heat of which normally warps the template.

References Cited in the file of this patent

UNITED STATES PATENTS

| | | |
|---|---|---|
| 925,638 | Kerr | June 22, 1909 |
| 1,496,948 | Schutt | June 10, 1924 |
| 1,911,336 | Ackerman | May 30, 1933 |
| 2,003,906 | Searles | June 4, 1935 |
| 2,160,598 | Melrath | May 30, 1939 |